June 13, 1939.  J. F. JACK  2,161,924

THERMOSTATIC VALVE

Filed March 9, 1935

JULIUS F. JACK.
INVENTOR.

BY *Rudolf Hildebrandt*
ATTORNEYS.

Patented June 13, 1939

2,161,924

UNITED STATES PATENT OFFICE 2,161,924

THERMOSTATIC VALVE

Julius F. Jack, Newark, N. J.

Application March 9, 1935, Serial No. 10,262

10 Claims. (Cl. 236—34)

This invention relates to a thermostatic valve for controlling the flow of fluids, e. g. through the motor of an automobile, or other types of liquid-cooled internal combustion engine. Its primary object is to control the flow of water from the radiator or other cooling medium while the engine is cold, thus reducing the amount of water circulated, as long as the temperature is below a predetermined minimum, thus reducing the period required for warming up the engine.

A great deal of difficulty is encountered in starting internal combustion engines in cold weather due to the coagulation of the oil, and the difficulty of evaporating the fuel in the carburetor and manifold. The time required for warming up an engine, under normal conditions with the full amount of cold water in both the radiator and the water jackets of the engine is considerable. During this period the engine is insufficiently lubricated, it is extremely wasteful of fuel, due to the poor combustion under cold operation and is generally inefficient. By retarding the circulation of water and by confining the amount of water to be immediately heated to the part contained in the engine water jackets and by excluding the water contained in the radiator, the warming up period is reduced. This enables the operator to start the engine, and have it operate, at or near its maximum efficiency in a few minutes. After the temperature of the cooling water has reached a predetermined minimum the valve opens, thus permitting the water in the radiator to flow through the jackets and prevents the water from boiling and the engine from overheating.

This is entirely automatic and independent of the operator.

In the prior art thermostatic valves of various types have been used where the circulating of a fluid is to be controlled in accordance with temperatures. In the usual type of thermostatic valve control of cooling systems the thermostat consists of a coil of bimetallic thermostatic material which is operatively connected to a valve in the water passage. But in the operation of automobiles and other motor vehicles under various climatic and operating conditions there is a marked tendency for dirt, clay and other impurities to collect in the cooling water. This dirt and other impurities tend to solidify in the water. As the coil of the usual thermostat is of necessity closely wound, with very little space between adjoining coils, the solid matter tends to form a crust which lodges between adjoining coils in the thermostat and prevents them from actuating the valve and functioning normally, until finally the coils are completely out of commission. This causes the water to boil and results in considerable injury to the car, annoyance to the operator, and, instead of being beneficial to, inflicts damage upon the engine. Besides, the coil, due to its bulk, sets up considerable resistance to the flow of the water through the restricted passage or tube. The result is that frequently automobile operators prefer a complete removal of the thermostat when it becomes clogged and therefore inoperative.

This invention is primarily directed to overcoming the difficulties encountered in the prior art, to obtain a thermostat which while inexpensive to build, offers a minimum resistance to the normal flow of the cooling fluid, is so constructed and arranged, that it prevents collection of foreign matter and by its operation it tends to remove any incrustation which may form and also to function successfully, even though such incrustation does form on the thermostatic member. The following description will portray in detail the various aspects of the invention and the functioning of the various parts thereof.

Figure 1:
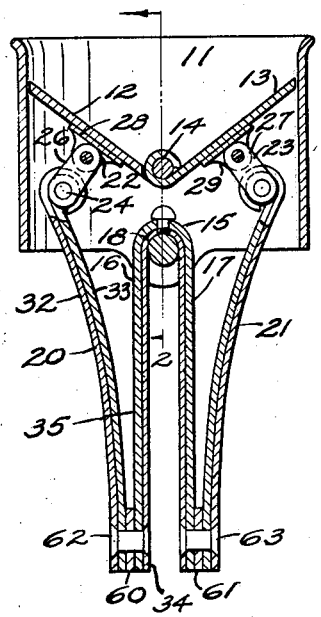
Fig. 1 represents a front section through the thermostatic valve in which the valve is closed, thus shutting off the flow of liquid through the passage.
Figure 2:
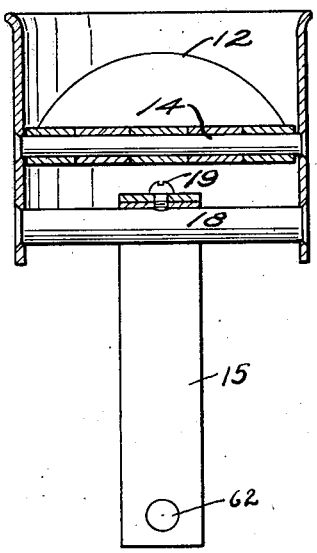
Fig. 2 is a section taken on the line 2—2 of Fig. 1 showing a section through the thermostat taken at the center of the valve.

Fig. 3 again represents a sectioned front elevation of the thermostatic valve—corresponding to that shown in Fig. 1—after the thermostatic material has been heated and the valve opened, permitting a free flow of liquid through the passage.

Figure 4:
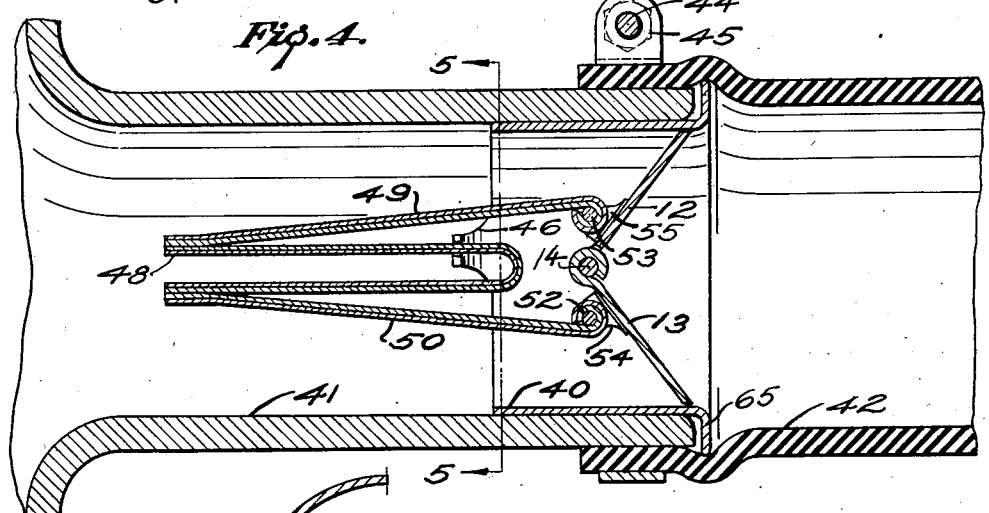

Fig. 4 represents an alternative construction showing the thermostat as in Fig. 1, closed, and inserted in the water outlet passage of the water jackets of an engine, as well as part of the hose connection to the radiator.

Figure 5:
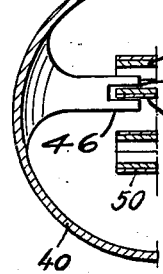

Fig. 5 presents in an end view a section taken on the line 5—5, Fig. 4, showing the method of guiding and controlling the movement of the thermostatic element.

Similar numerals refer to similar parts throughout the various views.

The detailed functions of the various parts of the thermostatic valve, with respect to the exemplary drawing, is as follows:

Tube 11 is inserted anywhere in a waterline, e. g. in a sleeve between hose connections the water preferably flowing therethrough in a direction from the bottom up. It acts as a supporting member of the entire unit, and as a water passage. The two sectors or wings 12 and 13 of the valve are hinged on the pin 14, which is fastened, e. g. riveted to the sides of the tube 11. The edge of the butterfly wings 12 and 13 is such that in the closed position of Fig. 1 they fit the contour of the inside of the tube 11. The thermostatic member consists of a center section 15 which is bent into a V-shape with two sections 16 and 17, over the pin 18, to which it is fastened e. g. by means of the screw 19. The other thermostatic members 20 and 21 are connected at the top to valves 12 and 13, respectively, by means of the hinges 22 and 23, respectively. The upper end of the member 20 is wrapped in the form of an eye around the pin 24, which connects, e. g. is riveted between the two links 26. The other ends of the links 26 are hinged upon the wing e. g. by way of a bracket 28, which is fastened, welded or brazed to the wing 12. The members 16 and 20 may be folded back parts of the same strip of thermostatic metal, because corresponding sides face each other. But in the drawing the bottom ends of the thermostatic members 16 and 20 are riveted together, by means of rivet 62, with the spacer 60 inserted between them. This joint may also also be made by welding, brazing or other suitable method. The thermostatic members 15, 20 and 21 are made of a bimetallic material, composed for instance, according to the art, of steel and copper layers, both layers of which are welded together. Due to the difference of expansion between these two materials under temperature variations the material changes its shape; one side tends to expand more than the other side when heated: The copper elements 32 and 34 having a higher coefficient of expansion tend to become longer under heat than the steel elements 33 and 35 which have a lower coefficient of expansion. As both sections are welded together, the only manner in which this relative lengthening can take place, is by forming an arc in which the copper elements 32 and 34 is the outside, convex side of the curve, and therefore longer than the steel elements 33 and 35.

When the thermostat shown in Fig. 1 is heated, e. g. when it is placed in hot water, the high expansive elements 32 and 34 tend to become longer than the low expansive elements 33 and 35. This causes the thermostatic elements to assume the shape shown in Fig. 3. While this change in shape of the thermostatic elements 15, 20 and 21 takes place the wings 12 and 13 are gradually opened until at a predetermined temperature they are fully open as shown in Fig. 3.

As both halves of the construction are symmetrical about the center-line 2—2, the same details and reaction described as regard parts 22, 26, 28, 60 and 62 or the elements 16 and 20 and valve sector or wing 12 also apply with regard to parts 23, 27, 29, 61 and 63 or elements 17 and 21 and valve sector or butterfly wing 13, respectively.

Figure 3:
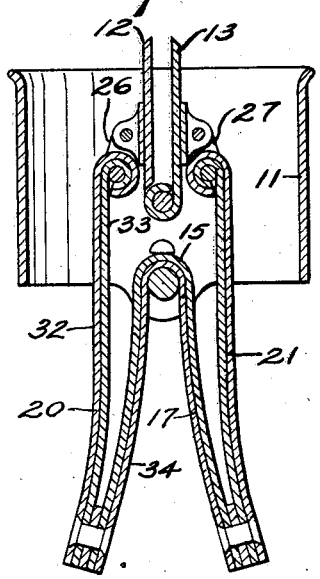

When the valve is fully opened, Fig. 3, the cold water from the engine flows through the tube 11. When the temperature of the water falls the high expansion elements 32 and 34 tend to become shorter than the low expansion elements 33 and 35. This causes the thermostatic members to reverse the previously described process; and then again tend to resume the shape shown in Fig. 1. In this manner the valve sectors 12 and 13 are gradually closed and when a predetermined temperature is reached the valve is again fully closed as shown in Fig. 1.

Since thermostatic metal strips are elastic, such elasticity may provide the tension desired to retain the butterfly wings 12 and 13 in the closed position of Fig. 1 against the pressure of the water (when pumped for instance) rising thereagainst. In other words the normal position of the elements 15, 20 and 21, when at a normal temperature, would be still more in contrast with their position in Fig. 3 than their position in Fig. 1, if they were not restrained by the closed butterfly wings.

Fig. 4 shows an alternative construction of the thermostatic valve. In Fig. 4 the valve tube 40 is inserted in the outlet 41 of the water manifold, e. g. the outlet of the engine. The rubber hose 42 the opposite end of which is connected to the radiator inlet is fastened over the water manifold outlet 41. At the end of the tube a hose clamp 43 is fastened over the hose 42 and tightened by means of the screw and nut 44 and 45 to maintain the hose in position. Thus the rubber hose engages upon the flared-out end 65 of tube 40 and retains it in position in the engine water manifold.

The thermostatic element itself is constructed in a manner similar to that shown in Fig. 1 with some modifications, i. e. longitudinally it is not fixedly mounted. The end of tube 40 is bent over to form a tongue 46 the end of which is notched to form a channel 47, which slidably guides the thermostat, e. g. the element 48, which is bent in the form of a V as previously described. The bottom ends of the thermostatic elements 48 and 49 are either united, e. g. riveted, welded or brazed together as previously described. They may be offset about the point of junction by slight kinks in order to similate the spacing of parts 16 and 20, so that the settling of materials therebetween is avoided. The top of element 49 is hinged upon the pin 53 of bracket 55, which forms part of the valve sector or wing 12. The other half of the thermostatic member is connected to valve sector or wing 13, in a similar manner. The operation of the thermostatic valve shown in Fig. 4 is identical with that shown and described in Fig. 1. The valve sectors or wings 12 and 13 gradually open when the thermostat is heated, to a predetermined temperature, and gradually close again as the temperature is lowered, until at a predetermined temperature the valve again resumes the position shown in Fig. 4.

In addition to the above outlines of the various constructions and the operation of the device, a large number of other modifications in its construction and operation suggest themselves to those skilled in the art, and may be applied under proper conditions. They fall within the general scope of this invention, as outlined in the following claims.

What I claim is:

1. In a valve, a tubular casing for a flowing fluid, a pair of wings pivoted in said casing, normally complementarily substantially closing said casing and controlling the flow of fluid therethrough, and a plurality of bimetallic strips symmetrically arranged in said casing and forming a W operatively connecting said wings, and controlling the opening and closing movement thereof.

2. A valve comprising a cylindrical casing, a pair of wings pivoted in said casing and controlling the flow of a fluid therethrough, a W-shaped bimetallic thermostatic element symmetrically suspended in said casing, and links pivotally connecting the free ends of said bimetallic element to said wings, respectively.

3. In a valve, a tubular casing, a pair of substantially semi-circular wings pivoted in said casing and controlling the flow of fluids therethrough, a V-shaped thermostatic member connected to and coaxially arranged in said casing, and a pair of elements connected at one end to said V-shaped member, and means connecting the other ends of said elements to the said wings.

4. A valve comprising a casing, a pair of wings pivoted in said casing, and controlling the flow of a fluid therethrough, a V-shaped, bimetallic, thermostatic element suspended in said casing, a guide extending from said casing and movably supporting said V-shaped member substantially at a central point thereof relatively to said casing, and a pair of bimetallic thermostatic elements extending from the free ends of said V-shaped member and operatively connected at their free ends with said wings.

5. In a valve, a cylindrical casing, a pair of substantially semi-circular wings pivoted in said casing and controlling the flow of a fluid therethrough, a sharply folded-back, bimetallic thermostatic element suspended in said casing, a guide extending substantially centrally through said casing and movably supporting said folded-back element, and a pair of bimetallic thermostatic elements operatively connecting the free ends of said folded-back element with said wings.

6. In a valve, a tubular casing a pair of coacting wings movably mounted in said casing and controlling the flow of a liquid therethrough, and a plurality of superimposed layers of bimetallic thermostatic metal comprising two inner and two outer legs interconnected with each other and coaxially arranged in respect to the axis of said casing, the outer legs being engaged upon said wings, respectively, and controlling their movement.

7. A tubular casing, a pair of substantially semi-circular valve wings pivoted in the center of said casing, and controlling the flow of liquid therethrough, a V-shaped bimetallic member suspended in said casing, a guide arranged substantially centrally in said casing slidably guiding said V-shaped member, spacers, and a pair of elements connected to the ends of said V-shaped member by way of said spacers and operatively connected at their opposite ends to and controlling the valve wings.

8. In an internal combustion engine, a water outlet, a pair of supplementary valve wings pivoted in said outlet and controlling the flow of liquid therethrough, and folds of bimetallic thermostatic strips symmetrically arranged in respect to the axis of said outlet, operatively interconnecting said valve wings, and moving said wings relatively to each other and said outlet when they are deformed by heat.

9. In combination with a butterfly valve controlling a passage, a pair of coacting closing wings swingable in said passage and a zig zag assembly of layers of bimetallic thermostatic metal longitudinally extended in said passage and operatively connecting said wings, said layers being centrally collapsed in said passage when said wings are open, but expanding transversely and closing said passage by swinging said wings across, when deformed by cooling.

10. A valve comprising a bimetallic element deformed by temperature changes of a fluid in said valve, and a plurality of movable wings serving as members controlling the passage of a fluid through said valve, and operatively interconnected by said bimetallic element, said element being movably arranged so that the said movable wings react upon each other through the element in their opening and closing movement.

JULIUS F. JACK.